United States Patent
Tsukagoshi (10) Patent No.: US 10,674,188 B2
(45) Date of Patent: Jun. 2, 2020

(54) PLAYBACK APPARATUS, METHOD OF CONTROLLING PLAYBACK APPARATUS, PLAYBACK METHOD AND SERVER APPARATUS

(71) Applicant: CANON KABUSHIKI KAISHA, Tokyo (JP)

(72) Inventor: Rieko Tsukagoshi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/040,693

(22) Filed: Jul. 20, 2018

(65) Prior Publication Data
US 2019/0037251 A1   Jan. 31, 2019

(30) Foreign Application Priority Data
Jul. 28, 2017   (JP) .................................. 2017-146797

(51) Int. Cl.
*H04N 21/2387* (2011.01)
*H04N 21/858* (2011.01)
*H04N 21/482* (2011.01)
*H04N 21/472* (2011.01)
*H04N 21/458* (2011.01)
*H04N 21/845* (2011.01)
*H04N 21/658* (2011.01)
*H04N 21/432* (2011.01)

(52) U.S. Cl.
CPC ..... *H04N 21/2387* (2013.01); *H04N 21/4325* (2013.01); *H04N 21/4586* (2013.01); *H04N 21/47217* (2013.01); *H04N 21/4825* (2013.01); *H04N 21/6582* (2013.01); *H04N 21/8456* (2013.01); *H04N 21/8586* (2013.01)

(58) Field of Classification Search
CPC ......... H04N 21/2387; H04N 21/47217; H04N 21/4825; H04N 21/8586; H04N 21/6125; H04N 21/47202; H04N 21/6175; H04N 21/8456; H04N 21/4351; H04N 21/2187; H04N 21/64776; H04N 21/6375; H04L 65/60
USPC ......................................................... 725/116
See application file for complete search history.

(56) References Cited

U.S. PATENT DOCUMENTS

| 2003/0093790 A1* | 5/2003 | Logan .................. G10H 1/0033 725/38 |
| 2008/0195664 A1* | 8/2008 | Maharajh ................ H04W 4/06 |
| 2012/0281562 A1* | 11/2012 | Holmer .................... H04N 7/24 370/252 |

FOREIGN PATENT DOCUMENTS

| JP | 2005-318250 A | 11/2005 |
| JP | 2015-119334 A | 6/2015 |

* cited by examiner

*Primary Examiner* — Cynthia M Fogg
(74) *Attorney, Agent, or Firm* — Cowan, Liebowitz & Latman, P.C.

(57) ABSTRACT

A playback apparatus, comprising a communication unit which communicates with an external apparatus, a display unit, a holding unit which holds content information related to content transmitted from the external apparatus to the playback apparatus, and a control unit, wherein the content comprises a plurality of segments, the content information includes segment information for identifying for which segments, among the plurality of segments, display by the display unit has completed, and the control unit based on the content information, controls the communication unit to receive from the external apparatus a segment for which display by the display unit has not completed among the plurality of segments.

14 Claims, 6 Drawing Sheets

PLAYBACK APPARATUS, METHOD OF CONTROLLING PLAYBACK APPARATUS, PLAYBACK METHOD AND SERVER APPARATUS

BACKGROUND OF THE INVENTION

Field of the Invention

The invention relates to a playback apparatus, a method of controlling a playback apparatus, a playback method, and a server apparatus.

Description of the Related Art

Streaming is a technique in which a playback apparatus such as a camera, a smartphone, or a television simultaneously plays back content data such as video or audio while receiving the content data from an external apparatus such as a server via communication by the Internet or the like.

A technique in which a delay or loss of data that may occur when transmitting/receiving data between apparatuses is resolved by deciding and obtaining data according to the content data usage is known (Japanese Patent Laid-Open No. 2015-119334). Also, a technique in which viewing without loss of data is enabled by managing viewing information in a file in order to enable for content streaming playback to be temporarily interrupted, and then once again for viewing of the same contents to be continued is known (refer to Japanese Patent Laid-Open No. 2005-318250).

Techniques in which, by using content information (hereinafter referred to as a "playlist") for managing information related to content on an external apparatus such as a server on the transmission side, loss of transmitted content data is prevented and re-viewing from a stoppage scene is enabled are known.

In the invention described in the aforementioned Japanese Patent Laid-Open No. 2015-119334, control is performed to update a playlist when transmission to a playback apparatus of segment data obtained by dividing content has completed. However, it is not necessarily the case that all segment data whose transmission to the playback apparatus has completed is invariably displayed on the playback apparatus side. Accordingly, a situation may arise in which information of a segment (segment that was already transmitted to the playback apparatus) which is managed in the playlist and segment data that was already played back in the playback apparatus are not consistent.

Also, in the invention described in Japanese Patent Laid-Open No. 2005-318250, control is performed to update a playlist only at the time of a temporary interruption of the play back of content intended by the user. In this case, a situation may arise in which, when a stoppage that the user did not intend arises due to a data reception error, the information of a segment that is being managed in a playlist and segment data that has already been played back in the playback apparatus are not consistent.

In this way, in the methods that have been proposed conventionally, situations in which information of a segment that has already been transmitted to the playback apparatus and segment data that the playback apparatus has already played back are not consistent arise, and thereafter when playback of content is resumed, a loss of segment data may occur.

SUMMARY OF THE INVENTION

The invention provides a technique that enables playback of content data without loss in streaming playback.

One aspect of embodiments of an invention relates to a playback apparatus, comprising a communication unit configured to communicate with an external apparatus, a display unit, a holding unit configured to hold content information related to content transmitted from the external apparatus to the playback apparatus, and a control unit, wherein the content comprises a plurality of segments, the content information includes segment information for identifying for which segments, among the plurality of segments, display by the display unit has completed, and the control unit based on the content information, controls the communication unit to receive from the external apparatus a segment for which display by the display unit has not completed among the plurality of segments.

Further features of the invention will become apparent from the following description of exemplary embodiments (with reference to the attached drawings).

DESCRIPTION OF THE EMBODIMENTS

Hereinafter, embodiments for working the invention will be explained in detail. Note that the embodiments described below are only examples of implementing the invention, and embodiments of the invention are not limited to the examples described below.

First Embodiment

Figure 1A:
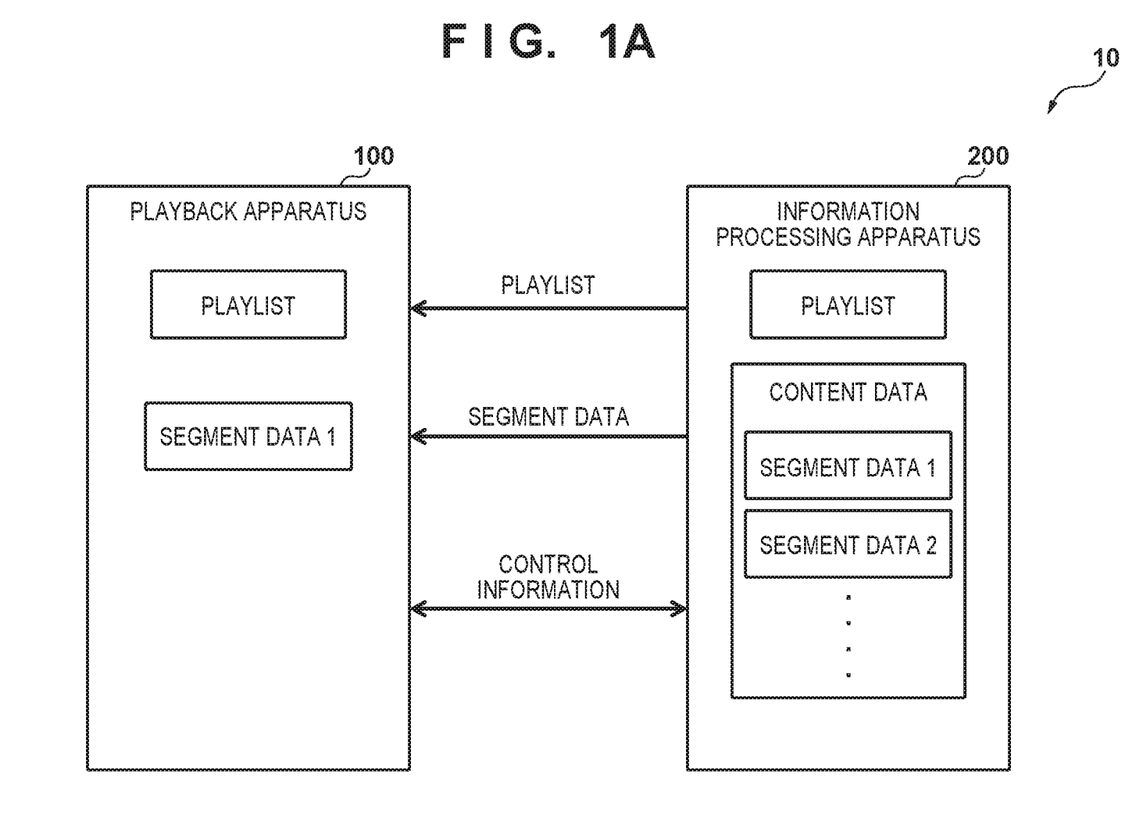
FIG. 1A is a view illustrating an example of a configuration of a system corresponding to an embodiment of the invention.

FIG. 1A is a view that illustrates an example of a configuration of a playback system corresponding to an embodiment of the invention. In the present embodiment, a playback system 10 has a playback apparatus 100 and an information processing apparatus 200 which is an external apparatus that communicates with the playback apparatus 100. The playback apparatus 100) can be configured as an apparatus such as a digital camera or a smartphone, for example, but is not limited to these. Also, the information processing apparatus 200 is an apparatus such as a content server, for example, that provides content such as video, audio, and the like to the playback apparatus 100, but it is not limited to this example. Communication between the playback apparatus 100 and the information processing apparatus 200 can be performed via the Internet, for example.

In the playback system 10, a playlist, segment data, and control information are transmitted/received between the playback apparatus 100 and the information processing apparatus 200. A playlist is management data that comprises information regarding content such as video, audio, or the like, and the information processing apparatus 200 side manages each piece of content, and is provided in a case where the playback apparatus 100 performs content playback. A more detailed data configuration is described later with reference to FIG. 3.

Segment data is data where a plurality of segments into which a single piece of content is divided in predetermined time units (for example, several seconds or about 2 seconds), and in a case of streaming a single piece of content, a plurality of pieces of segment data are generated based on one piece of content data. In a case of streaming saved content, the information processing apparatus 200 divides the saved content, and generates a plurality of segments. Also, in the case of streaming content being captured in real time, for example, the information processing apparatus 200 sequentially generates segments each time the capturing progresses and a predetermined amount of captured image data is recorded. Segment identification information for uniquely identifying the segment is assigned to each segment. In FIG. 1A, for simplicity, only segment data 1 and segment data 2 are illustrated, but any form is possible if each segment can be uniquely identified. As the identification information, it is possible to use information such as a URL address, or the like, for accessing each segment by a predetermined communication protocol. Streaming is realized by the segment data being transmitted sequentially from the information processing apparatus 200 in accordance with a request from the playback apparatus 100, and played back sequentially in the playback apparatus 100. Control information is a control command (simply referred to as a command) to a communication counterparty device.

Figure 1B:
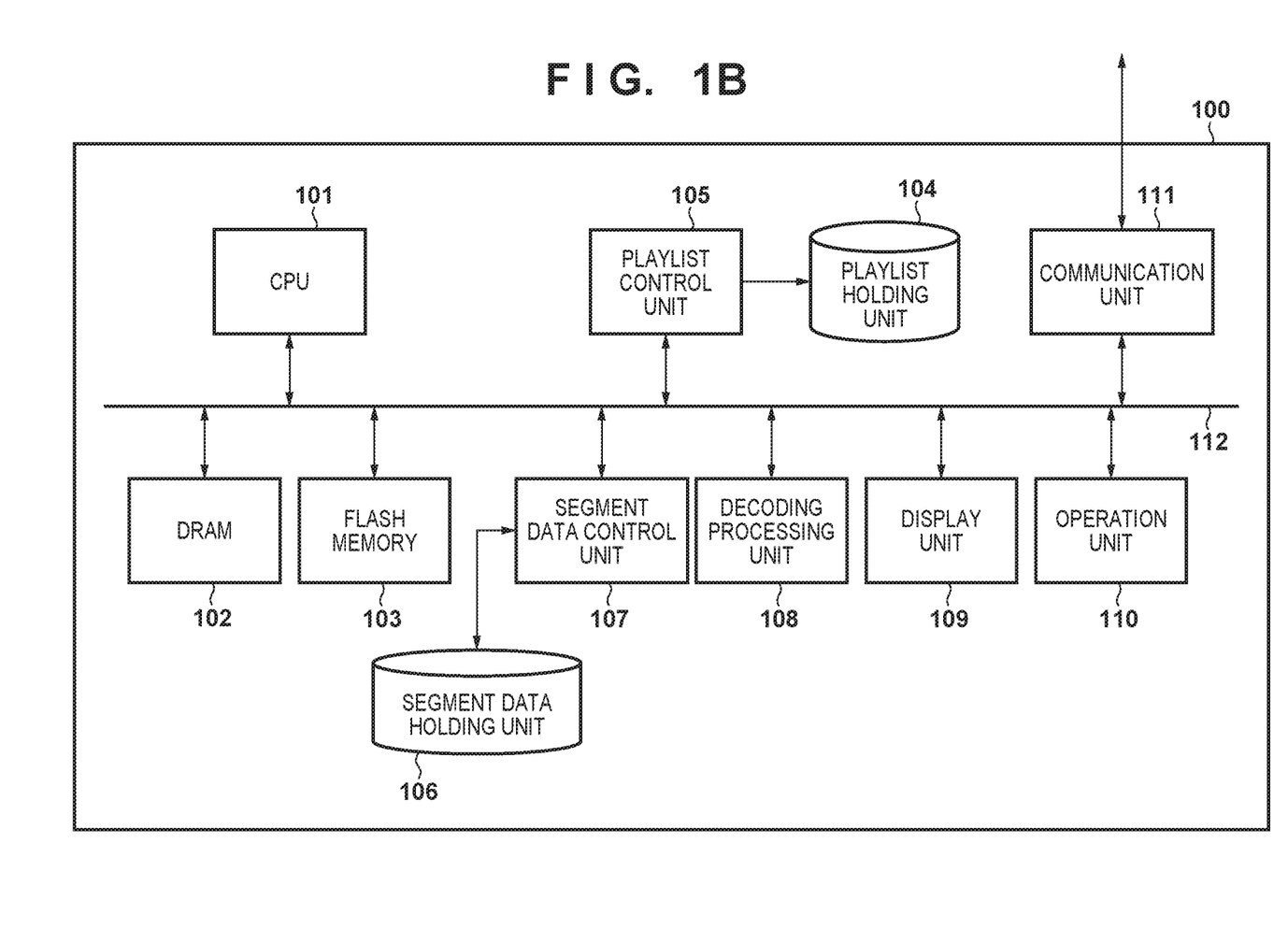
FIG. 1B is a view illustrating an example of a configuration of a playback apparatus 100 corresponding to an embodiment of the invention.

Next, description is given of a configuration of the playback apparatus 100 according to the present embodiment, with reference to FIG. 1B. The playback apparatus 100 illustrated in FIG. 1B can be realized as an information processing terminal or display apparatus such as a personal computer, a mobile phone, a smartphone, a PDA, a tablet terminal, or a mobile media player.

A CPU 101 controls operation of the playback apparatus 100 overall. A DRAM 102 is a memory capable of holding data or the like temporarily when the CPU 101 operates. In a flash memory 103, programs that the CPU 101 executes, including a program for executing processing corresponding to the present embodiment, are stored. A playlist holding unit 104 is a memory that holds a playlist received from the information processing apparatus 200.

A playlist control unit 105 performs control for writing playlists to the playlist holding unit 104 and reading playlists therefrom, and performs analysis of playlists. A segment holding unit 106 is a memory that holds segment data received from the information processing apparatus 200. A segment data control unit 107 controls writing of segment data to the segment holding unit 106 and reading of segment data therefrom. A decoding processing unit 108 performs processing for decoding received segment data. A display unit 109 is a display apparatus such as an LCD for displaying segment data on which processing for decoding was performed by the decoding processing unit 108. An operation unit 110 is a mechanism for receiving user operations in relation to the playback apparatus 100, and includes various operation components such as buttons, a touch panel, and a dial. A communication unit 111 performs communication with the information processing apparatus 200. A control bus 112 has a function for the CPU 101 to control each block.

Note that in FIG. 1B, the playlist control unit 105 and the segment data control unit 107 are described as configurations that are independent from the CPU 101, but the CPU 101 may operate as the control unit of these. Also, similarly, the playlist holding unit 104 and the segment holding unit 106 are described as configurations that are independent of the flash memory 103, but these may be configured as portions of the flash memory 103. Conversely, configuration may be taken such a number of pieces of hardware function as a single means in the playback apparatus 100 by distributing/cooperating on processing. Also, the configurations in the playback apparatus 100 may be configured from hardware by using a dedicated logic circuit and a memory. Alternatively, they may be configured in software by a computer such as a CPU executing a processing program stored in a memory.

Also, the information processing apparatus 200 corresponding to the present embodiment may be configured to be the same as the playback apparatus 100 illustrated in FIG. 1B. Hereinafter, when describing each constituent element in the information processing apparatus 200, reference numerals in the 200s will be assigned. For example, when mentioning the CPU of the information processing apparatus 200, it will be referred to as the CPU 201.

Figure 2:
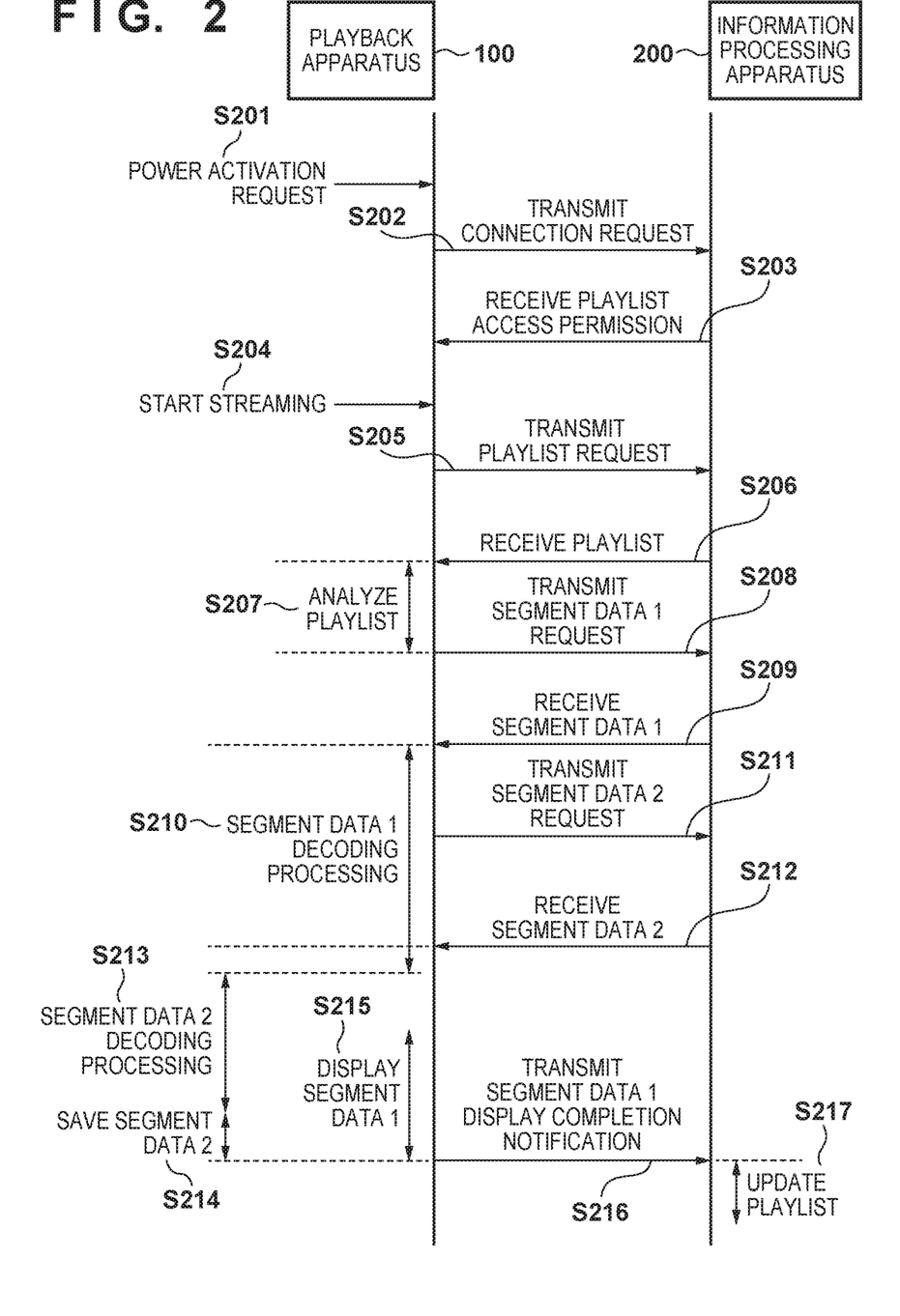
FIG. 2 is a sequence diagram that indicates communication between the playback apparatus 100 and an information processing apparatus 200 and processing in each apparatus at a time of streaming playback corresponding to a first embodiment of the invention.

Next, operation of each apparatus in the playback system 10 at the time of streaming playback will be described with reference to FIG. 2. FIG. 2 is a sequence diagram that indicates communication between the playback apparatus 100 and the information processing apparatus 200 at a time of streaming playback and processing in each apparatus according to the present embodiment. The sequence diagram of FIG. 2 envisions a case in which the content to be played back is configured by two or more segments, and is played back for the first time.

When the CPU 101 receives a power activation request based on the user input via the operation unit 110 in step S201, it transitions an operation mode of the playback apparatus 100 to a live streaming mode. The live streaming mode is an operation mode in which the playback apparatus 100, while receiving content from the information processing apparatus 200 in units of segment data, simultaneously plays the content back, displaying it on the display unit 109. Next, in step S202, the CPU 101, via the communication unit 111, transmits to the information processing apparatus 200 control information requesting a connection. Next, in step S203, the CPU 101 receives control information permitting access to the playlist from the information processing apparatus 200 via the communication unit 111. By this, the playback apparatus 100 and the information processing apparatus 200 enter a state in which they are able to communicate, and thereafter, communication between the playback apparatus 100 and the information processing apparatus 200 is performed via the communication unit 111.

In step S204, the CPU 101 receives a live streaming start request based on user input via the operation unit 110. Next, in step S205, the CPU 101 transmits control information requesting a playlist to the information processing apparatus 200 via the communication unit 111 in order to obtain the playlist as content information. In the playlist, information necessary for playing back the content in the playback apparatus 100 is registered. Details of the playlist will be described later with reference to FIG. 3. The information processing apparatus 200 transmits the playlist to the playback apparatus 100 in response to the playlist request from the playback apparatus 100.

Next, when the CPU 101, in step S206, via the communication unit 111 receives the playlist that the information processing apparatus 200 transmitted, the CPU 101 controls the playlist control unit 105 and causes the playlist holding unit 104 to hold the playlist. Next, in step S207, the CPU 101 controls the playlist control unit 105, and analyzes the playlist that the playlist holding unit 104 holds. In this analysis, a leading segment for when playback is to be started is identified, and notified to the CPU 101. Here, the playlist control unit 105 notifies to the CPU 101 identification information for identifying the leading segment. The segment identified here is referred to as "segment 1" in the present embodiment, and will be described hereinafter.

Next, in step S208, the CPU 101 controls the communication unit 111 and transmits to the information processing apparatus 200 control information for requesting data of segment 1 ("segment data 1"). Designation of segment data 1 is performed based on a URL included in the playlist. This URL is used as information for designating segment data 1 to the information processing apparatus 200 from the playback apparatus 100, and the information processing apparatus 200 transmits to the playback apparatus segment data 1 which is assigned to the designated URL.

Next, when the CPU 101, in step S209, via the communication unit 111 receives segment data 1 which the information processing apparatus 200 transmitted, the CPU 101 controls the segment data control unit 107 and causes the segment holding unit 106 to hold segment data 1. Segment data 1 is encoded in accordance with a predetermined encoding scheme, and therefore it is necessary to decode it in accordance with a corresponding decoding scheme in order to display it in the playback apparatus 100. Accordingly, next, in step S210, the CPU 101 controls the decoding processing unit 108, and executes processing to decode segment data 1 which the segment data control unit 107 holds. The decoded segment data 1 is held once again by the segment holding unit 106.

While the processing for decoding segment data 1 is being executed in step S210, the CPU 101, so as to obtain data of segment 2 (segment data 2) which continues after segment 1, transmits control information requesting segment data 2 to the information processing apparatus 200 via the communication unit 111 in step S211. The method for designating segment data 2 is, similarly to for segment data 1, to use a URL assigned to the segment data 2 in the playlist.

Next, when the CPU 101, in step S212, via the communication unit 111 receives segment data 2 which the information processing apparatus 200 transmitted, the CPU 101 controls the segment data control unit 107 and causes the segment holding unit 106 to hold segment data 2. Next, in step S213, the CPU 101 controls the decoding processing unit 108, and executes processing to decode segment data 2 which the segment holding unit 106 holds. After the processing for decoding the segment data 1 ends, the processing for decoding segment data 2 is continuously executed in preparation for the next display. The decoded segment data 2 is held once again by the segment holding unit 106 in step S214. By this, after display of the segment data 1 completes, it is possible to start play back of the segment data 2 immediately.

Meanwhile, in step S215, the CPU 101 controls the segment data control unit 107, and in step S210, reads out the decoded segment data 1 from the segment holding unit 106, supplies it to the display unit 109, and thereby displays on the screen segment data 1. When the display of segment data 1 has completely ended (display completes), the CPU 101, in step S216, controls the communication unit 111 and transmits to the information processing apparatus 200 control information for the completion of the display of segment data 1. When the information processing apparatus 200 receives from the playback apparatus 100 the control information for completion of the display of segment data 1, the CPU 201 of the information processing apparatus 200, in step S217, controls a playlist control unit 205 to update the content of the playlist and holds it in a playlist holding unit 204. By this, it is possible to synchronize between the playback state in the playback apparatus 100 and the playlist being held in the information processing apparatus 200.

Note that the timing of the display of segment data 1 may be immediately after the processing for decoding segment data 1, and configuration may be taken to provide the segment holding unit 106 with a buffer region and display at a timing at which a certain amount (for example, three segments' worth) of segment data has accumulated in the region. In particular, in a case where the communication rate is slow, there is the possibility that reception and decoding of segment data 2 will not have completed at the point in time when the display of segment data 1 has completed, and so there is the possibility that the playback will be interrupted. In such a case, it is effective to provide a buffer region, and perform playback only after accumulating a certain amount of segment data on the playback apparatus 100 side. The real-time nature of the playback will be impaired due to the start of playback being delayed when a buffer is employed, but on the other hand there is the advantage that it is possible to reduce interruption of playback.

Note that in the sequence diagram of FIG. 2, updating of the playlist is performed only on the side of the information processing apparatus 200, but configuration may be taken to update the content of the playlist that the playback apparatus 100 holds locally also upon a display completion notification transmission.

Figure 3:
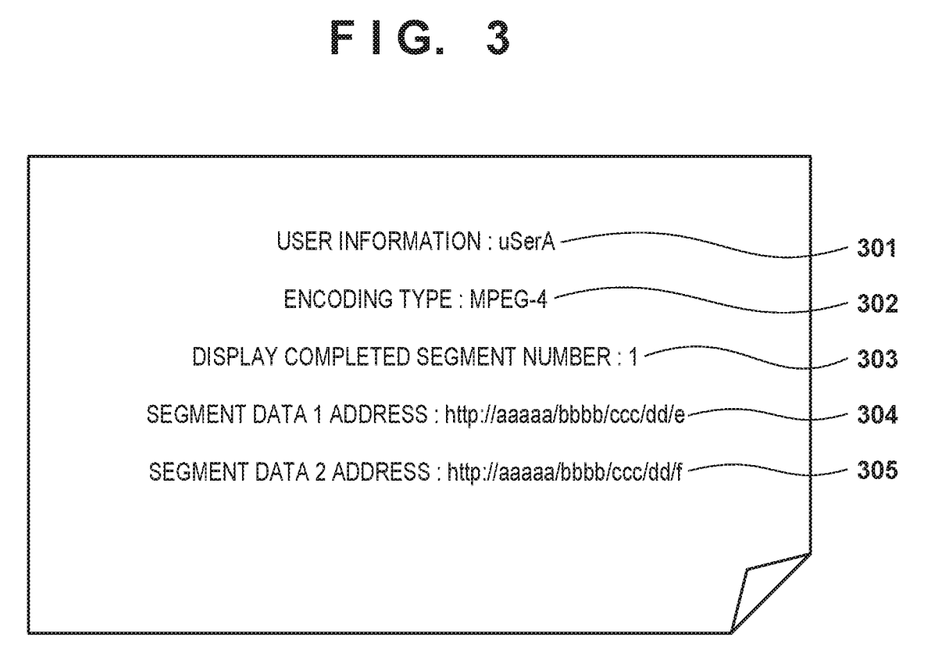
FIG. 3 is a view illustrating an example of a playlist data configuration corresponding to an embodiment of the invention.

Here, a playlist which is content information corresponding to the present embodiment will be described. FIG. 3 is a view that illustrates an example of a data configuration of a playlist. The playlist is generated in the information processing apparatus 200 for each piece of content to be played back on the playback apparatus for each user that has a playback apparatus with which to communicate. Consequently, even for the same content, different playlists are generated for each user that will connect, and it is possible to manage the state of playback of content in units of users. Also, even for the same user, it is possible to manage the state of playback of each piece of content.

The playlist registers user information 301 for identifying the user that plays back the content. Note that configuration may be taken to register terminal identification information for each terminal that a user uses. In such a case, it becomes possible to enable management of the condition of content playback in units of terminals in more detail even than units of users. Also, information of the encoding scheme of the content is registered as an encoding type 302. In the example of FIG. 3, the encoding scheme is MPEG-4. The encoding type 302 is referenced in order to decide the decoding scheme when executing decoding processing in the decoding processing unit 108 of the playback apparatus 100.

The playlist further registers a display completed segment number 303 as segment information for identifying a segment for which display has completed in the playback apparatus 100. In the display completed segment number 303, it is possible to register identification information of segments for which display has completed, for example. The initial value of the display completed segment number 303 is "0", and in the case where the display completed segment number 303 is the initial value there is no segment for which display has completed. This corresponds to a case where the content is first played back. Accordingly, in this case, the leading-most segment (segment 1) among the plurality of segments that configure the content is selected for the display target. Also, in step S217 described previously, the display completed segment number 303 is updated to "1" in response to completion of display of segment data 1.

In the playlist, URL information necessary for the playback apparatus 100 to obtain each segment is registered. In FIG. 3, an example in which URLs 304 and 305 for segment data 1 and segment data 2 are registered is illustrated, but there is no limitation to this, and URLs for all of the segment data included in the content may be registered. The URL identifies the corresponding segment data, and uses it when making a request for provision of segment data to the information processing apparatus 200.

By configuring the playlist in this way, the playback apparatus 100, in accordance with the display completed segment number 303 registered in the playlist, is able to identify the leading segment data among the yet to be played back segment data, and request the information processing apparatus 200 to transmit segment data by using the URL of the segment data.

Note that, as another possible example of a playlist, in a case where notification of completion of display is received from the playback apparatus 100 side, the CPU 201 of the information processing apparatus 20X) updates the playlist, and deletes the information of the segment for which the notification was received from the playlist. In other words, in the example of FIG. 3, the information processing apparatus 200 deletes the URL 304 for segment data 1 for which display has completed from the playlist, and defines only the URL 305 of segment data 1. With such a configuration, if the playback apparatus 100 requests the segment data in the order in which it is defined in the playlist, it is possible to obtain sequentially the segment data for which display has yet to be completed.

Figure 4:
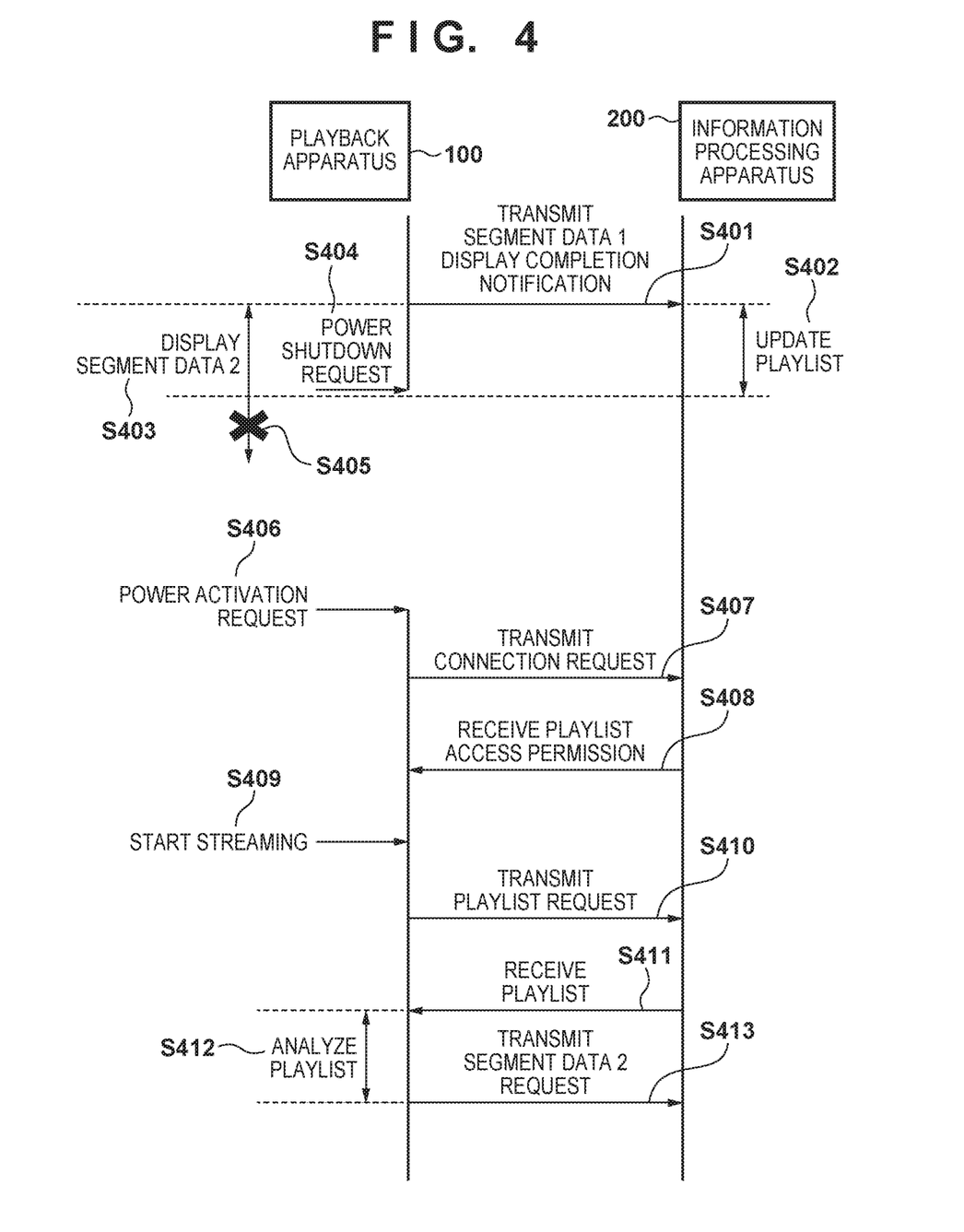
FIG. 4 is a sequence diagram that illustrates communication between the playback apparatus 100 and the information processing apparatus 200 and processing in each apparatus at a time of streaming playback resumption corresponding to the first embodiment of the invention.

Next, the operation of each apparatus in the playback system 10 at the time of streaming playback resumption after streaming playback is temporarily stopped is described with reference to FIG. 4. FIG. 4 is a sequence diagram that indicates communication between the playback apparatus 100 and the information processing apparatus 200 at a time of streaming playback resumption and processing in each apparatus according to the present embodiment. In the sequence diagram of FIG. 4, the sequence from step S215 in which the playback apparatus 100 completes display of segment data 1 by the display unit 109, as illustrated in previously described FIG. 2, is described.

When the display of segment data 1 in the playback apparatus 100 completely ends, the CPU 101, in step S401, transmits the control information for notifying completion of display of segment data 1 to the information processing apparatus 200 via the communication unit 111. When the information processing apparatus 200 receives the display completion notification, it updates the content of the display completed segment number 303 of the playlist in step S402. In the example illustrated in FIG. 3, since the display completed segment number 303 has the initial value "0", this is updated to the value "1" corresponding to segment data 1.

Here, step S401 and step S402 correspond to step S216 and step S217 of previously described FIG. 3.

Thereafter, streaming processing proceeds in accordance with the segment data received in segment units from the information processing apparatus 200 in accordance with the segment playback order of segment data 2, 3, . . . being decoded in order, and played back. However, in the present embodiment, description is given for playback resumption processing for the case where the playback processing is interrupted in the middle of streaming which is being executed in this fashion. Here, a case in which the playback display is interrupted upon a power disconnection during display of segment data 2 is described as an example. However, the reason for the playback being interrupted is not limited to a power disconnection.

As illustrated in step S213 and step S214 of FIG. 2, when playback of the immediately preceding segment data 1 ends, processing for decoding segment data 2 has already completed, and a decoding result has been saved. Accordingly, it is possible to start play back of the segment data 2 immediately, simultaneously to playback of the segment data 1 completing. In step S403, the CPU 101 controls the segment data control unit 107, reads out the decoded segment data 2 which is the playback target from the segment holding unit 106, and displays it to the display unit 109.

The CPU 101, in step S404, receives a power disconnection request based on user input via the operation unit 110 in the middle of displaying segment data 2. In response to the power disconnection request, the CPU 101 turns off the power supply of the playback apparatus 100 and causes operation of the playback apparatus 100 to stop. Consequently, since display of segment data 2 is interrupted as illustrated in step S405, segment data 2 is not displayed completely. Here, since display of segment data 2 has not completed, display completion notification such as is transmitted in step S401 is not transmitted from the playback apparatus 100 to the information processing apparatus 200. Accordingly, on the information processing apparatus 200 side, updating of the playlist is not performed after updating the playlist in step S402. Here, the display completion segment number 303 of the playlist that the information processing apparatus 200 manages continues to indicate segment data 1.

Thereafter, the CPU 101 receives a power activation request based on user input via the operation unit 110 in step S406. The CPU 101, in response to the power activation request, once again activates the playback apparatus 100 in the live streaming mode. Since the processing from step S407 to step S411, which is a sequence thereafter up until the playback apparatus 100 receives the playlist from the information processing apparatus 200, is similar to the processing from step S202 to step S206 as illustrated in FIG. 2, description is omitted here.

In step S412, the CPU 101 controls the playlist control unit 105, and analyzes the playlist that the playlist holding unit 104 holds. In this analysis, a leading segment for when playback is to be started is identified, and notified to the CPU 101. The playlist control unit 105 notifies to the CPU 101 identification information for identifying the leading segment when playback is resumed. Here, the display completed segment number 303 of the playlist indicates segment data 1 as the result of the update in step S402. Here, the segment for which display has not completed due to a playback interruption such as a power disconnection can be treated as the segment immediately after the segment for which display has completed that display completed segment number 303 indicates. Also, if streaming is resumed from the segment following the segment for which display has completed, it is possible to resume the streaming from the segment at the time of interruption of the playback. Accordingly, the playlist control unit 105 identifies "2" as the segment number from which to start display.

After receiving this, the CPU 101 next, in step S413, controls the communication unit 111, and transmits to the information processing apparatus 200 control information for requesting segment data 2. Designation of segment data 2 is performed based on a URL included in the playlist, as described above. Regarding the processing for reception of segment data 2 thereafter, decoding, and display of segment data 2, description is omitted here because it is similar to the processing in step S209, step S210, and step S215 of FIG. 2.

As described above, the playback system 10 corresponding to the present embodiment operates so that the playback apparatus 100 and the information processing apparatus 200 update the playlist every time display of the segment data completes. By this, it becomes possible to identify the final segment data for which display completed by using the playlist. Accordingly, even in a case such as when streaming is forcibly ended due to a power disconnection of an apparatus or the like, it becomes possible to resume streaming playback without loss of content data from segment data for which display was part way through but not completed.

Second Embodiment

In the first embodiment described above, the playlist is updated on the information processing apparatus 200 side based on a display completion notification notified in response to completion of playback of segment data on the playback apparatus 100 side. In contrast to this, in the present embodiment, when playback of segment data completes on the playback apparatus 100 side, the playlist is updated on the playback apparatus 100 side, and the playlist after the update is transmitted to the information processing apparatus 200. On the information processing apparatus 200 side, the playlist prior to update that is being held is overwritten by the received updated playlist.

Figure 5:
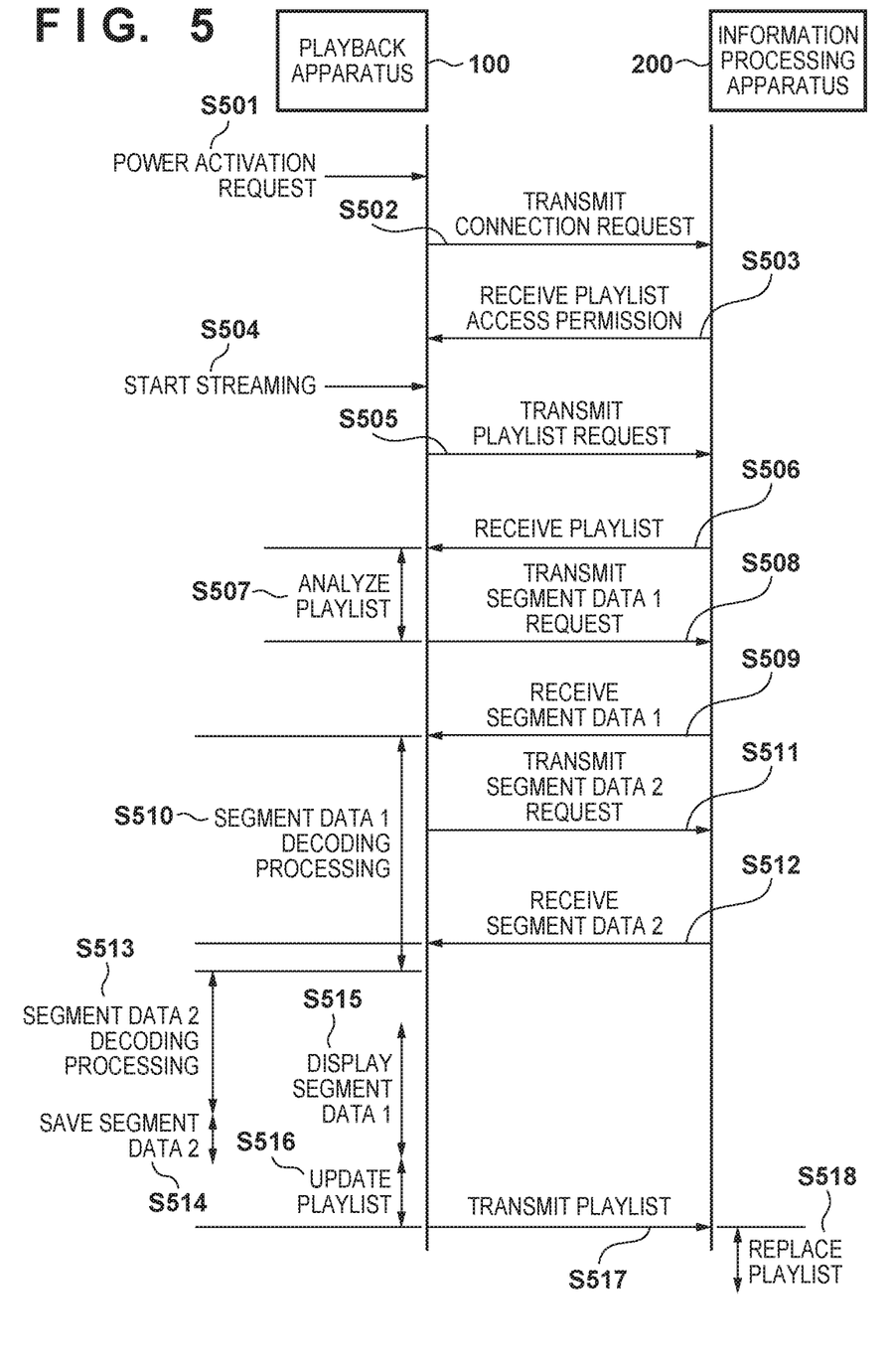
FIG. 5 is a sequence diagram that indicates communication between the playback apparatus 100 and the information processing apparatus 200 and processing in each apparatus at a time of streaming playback resumption corresponding to a second embodiment of the invention.

The configuration of the playback system 10 according to the present embodiment and the configurations of the playback apparatus 100 and the information processing apparatus 200 are similar to what is illustrated in FIG. 1A and FIG. 1B respectively, and therefore description thereof is omitted here. Below, operation of each apparatus in the playback system 10 corresponding to the present embodiment will be described with reference to FIG. 5. FIG. 5 is a sequence diagram that indicates communication between the playback apparatus 100 and the information processing apparatus 200 at a time of streaming playback and processing in each apparatus according to the present embodiment.

In FIG. 5, from step S501 to step S514 is similar to from step S201 to step S214 indicated in previously described FIG. 2, and therefore description thereof is omitted here.

In step S515, the CPU 101 controls the segment data control unit 107 and displays on the display unit 109 segment data 1 which was decoded in step S510. When display of segment data 1 completely ends, the CPU 101 in step S516 controls the playlist control unit 105, and updates the playlist that the playlist holding unit 104 holds. Specifically, the display completed segment number 303 is updated from the initial value "0" to the value "1" which indicates segment data 1. Next, in step S517, the CPU 101, via the communication unit 111, transmits to the information processing apparatus 200 the updated playlist. In step S518, the CPU 201 of the information processing apparatus 200 controls the playlist control unit 205 and rewrites the playlist being held in the playlist holding unit 204 by overwriting it with the received updated playlist.

As described above, the playback system 10 corresponding to the present embodiment operates so that the playback apparatus 100 and the information processing apparatus 200 update the playlist every time playback of the segment data completes. Accordingly, even in a case such as when streaming is forcibly ended similarly to in the first embodiment, it becomes possible to resume streaming playback without loss of content data from segment data for that was in the middle of being displayed.

Other Embodiments

Embodiments of the invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-146797, filed on Jul. 28, 2017, which is hereby incorporated by reference herein in its entirety.

What is claimed is:

1. A playback apparatus, comprising:
one or more processors;
a memory; and
a program stored in the memory which, when executed by the one or more processors, causes the playback apparatus to perform:
receiving content comprising a plurality of segments, for each segment;
displaying on a display unit the received content for each segment;
holding, as a part of content information related to content transmitted from an external apparatus to the playback apparatus, segment information for identifying for which segments, among the plurality of segments, display by a display unit has completed;

transmitting the content information to the external apparatus; and when the display by the display unit is interrupted, based on the content information, receiving a segment for which display by the display unit has not completed among the plurality of segments in order to resume the display.

2. The playback apparatus according to claim 1, wherein in the holding segment information, every time display of one segment by the display unit completes, the segment information included in the content information is updated, and in the transmitting the content information, the content information including the updated segment information is transmitted to the external apparatus as updated content information.

3. The playback apparatus according to claim 2, wherein the program stored in the memory which, when executed by the one or more processors, causes the playback apparatus to further perform in a case where display of the content is performed, receiving the content information from the external apparatus, and wherein in a case where the updated content information has been transmitted to the external apparatus, the content information received from the external apparatus is the updated content information.

4. The playback apparatus according to claim 1, wherein the segment information includes information for identifying a final segment for which display by the display unit completed.

5. A method of controlling a playback apparatus comprising:

receiving content comprising a plurality of segments, for each segment;

displaying on a display unit the received content for each segment;

holding, as a part of content information related to content transmitted from an external apparatus to the playback apparatus, segment information for identifying for which segments, among the plurality of segments, display by a display unit has completed;

transmitting the content information to the external apparatus; and when the display by the display unit is interrupted, based on the content information, receiving a segment for which display by the display unit has not completed among the plurality of segments in order to resume the display.

6. A playback apparatus, comprising:

one or more processors;

a memory; and a program stored in the memory which, when executed by the one or more processors, causes the playback apparatus to perform:

sequentially receiving content comprising a plurality of segments for each content from an external apparatus, wherein the content is received for each segment based on access information which is included in a playlist that lists access information related to a portion of the plurality of segments and received from the external apparatus;

displaying on a display unit received content for each segment to perform video display; and transmitting to the external apparatus identification information for identifying a segment for which display has completed among the plurality of segments;

when the video display is interrupted, resuming the video display based on a playlist, received from the external apparatus, in which a segment next to the segment for which display has completed is specified based on the identification information.

7. The playback apparatus according to claim 6, wherein the transmitting the identification information comprising every time display of one segment by the display unit completes, transmitting to the external apparatus a completion notification related to the segment for which display has completed.

8. The playback apparatus according to claim 6, wherein the playlist includes an identifier that identifies a segment for which display has completed, and the transmitting the identification information comprising every time display of one segment by the display unit completes, transmitting to the external apparatus the playlist after changing the identifier in response to display completion.

9. The playback apparatus according to claim 6, wherein the access information is a URL assigned to the segment.

10. The playback apparatus according to claim 6, wherein the displaying on a display unit received content for each segment to perform video display including performing live streaming playback by sequentially displaying the plurality of segments.

11. The playback apparatus according to claim 6, wherein the playlist includes information indicating an encoding scheme of the content.

12. The playback apparatus according to claim 6, wherein the plurality of segments are data obtained by dividing the content into predetermined time units.

13. A content playback method comprising:

sequentially receiving content comprising a plurality of segments for each content from an external apparatus, wherein the content is received for each segment based on access information which is included in a playlist that lists access information related to a portion of the plurality of segments is received from the external apparatus;

displaying on a display unit received content for each segment to perform video display; and transmitting to the external apparatus identification information for identifying a segment for which display has completed among the plurality of segments;

when the video display is interrupted, resuming the video display based on a playlist, received from the external apparatus, in which a segment next to the segment for which display has completed is specified based on the identification information.

14. A server apparatus that transmits content to a playback apparatus, the server apparatus comprising:

one or more processors;

a memory; and a program stored in the memory which, when executed by the one or more processors, causes the playback apparatus to perform:

dividing the content to generate a plurality of segments;

sequentially transmitting content comprising the plurality of segments for each segment by communicating with the playback apparatus to enable the playback apparatus to perform video display;

transmitting to the playback apparatus a playlist that lists access information related to a portion of the plurality of segments to enable the playback apparatus to receive content for each segment based on access information included in the playlist;

receiving from the playback apparatus information for identifying a segment for which display has completed in the playback apparatus;

in accordance with the received information for identifying the segment for which the display has completed, updating the playlist;

in response to a request of the playlist from the playback apparatus which is caused by an interruption of the video display, transmitting to the playback apparatus the updated playlist related to a segment for which display by the playback apparatus has not completed among the plurality of segments.

* * * * *